United States Patent [19]

Miyashita et al.

[11] Patent Number: 5,474,603
[45] Date of Patent: Dec. 12, 1995

[54] AQUEOUS METALLIC INK FOR BALL-POINT PEN

[75] Inventors: Hiroshi Miyashita, Koshigaya; Sachiko Matsuda, Soka; Eiichi Okabe, Koshigaya, all of Japan

[73] Assignee: Pentel Kabushiki Kaisha, Tokyo, Japan

[21] Appl. No.: 307,766

[22] Filed: Sep. 27, 1994

[30] Foreign Application Priority Data

Jan. 29, 1993 [JP] Japan .................. 5-034201
Apr. 30, 1993 [JP] Japan .................. 5-128350
Sep. 30, 1993 [JP] Japan .................. 5-267907

[51] Int. Cl.$^6$ .................. C09D 11/18; C09D 11/14
[52] U.S. Cl. .................. 106/25 R; 106/20 C; 106/22 C; 106/22 F; 106/25 A
[58] Field of Search .................. 106/25 R, 25 A, 106/20 C, 22 C, 22 F

[56] References Cited

U.S. PATENT DOCUMENTS

| | | | |
|---|---|---|---|
| 4,180,407 | 12/1979 | Gibson et al. | 106/23 C |
| 4,490,177 | 12/1984 | Shioi et al. | 106/22 C |
| 4,545,819 | 10/1985 | Shioi et al. | 106/22 C |
| 4,604,139 | 8/1986 | Shioi et al. | 106/22 C |
| 5,302,195 | 4/1994 | Helbrecht et al. | 106/22 F |

FOREIGN PATENT DOCUMENTS

| | | |
|---|---|---|
| 59-172565 | 9/1984 | Japan . |
| 60-186573 | 9/1985 | Japan . |
| 62-37678 | 8/1987 | Japan . |
| 64-4551 | 1/1989 | Japan . |
| 1-210478 | 8/1989 | Japan . |
| 1-56109 | 11/1989 | Japan . |
| 2-279777 | 11/1990 | Japan . |
| 3-250074 | 11/1991 | Japan . |

*Primary Examiner*—Helene Klemanski
*Attorney, Agent, or Firm*—Wenderoth, Lind & Ponack

[57] ABSTRACT

An aqueous metallic ink for a ball-point pen which is prevented from causing deterioration such as sedimentation of aluminum powder during the storage for a long period of time and which can be continuously used for writing. The ink comprises an aluminum powder, a natural polysaccharide or a dierivative thereof as a thickener, a water-soluble organic solvent and water, and has a viscosity of 100 to 1,500 P (ST rotor of E-type viscometer, 1 rpm, 25° C.) and a ratio of the viscosity at 1 rpm to that at 10 rpm of at least 3.0.

7 Claims, No Drawings

AQUEOUS METALLIC INK FOR BALL-POINT PEN

TECHNICAL FIELD

The present invention relates to an aqueous metallic ink for a ball-point pen, which contains an aluminum powder as the colorant and which is capable of realizing a writing of a metallic color such as gold or silver. In particular, the present invention relates to an aqueous metallic ink for a ball-point pen, in which the aluminum powder does not cause sedimentation even during storage for a long period of time and which is excellent in delivery to enable continuous writing.

BACKGROUND ART

An aluminum or bronze powder is used as the pigment for imparting a metallic gloss to writings so as to obtain writings of a metallic color such as gold or silver. The particle diameter of the bronze powder having a specific gravity of 8.5 must be several μm in order to obtain a writing of a metallic color and, therefore, problems such as sedimentation and separation of the powder and clogging at the pen point are caused to make the use of the bronze powder as the pigment for a writing ink very difficult. On the contrary, the aluminum powder having a specific gravity of 2.5 is more easily usable than the bronze powder for producing a writing ink. However, the specific gravity, 2.5, of the aluminum powder is by no means low. Inks for a marking pen containing the aluminum powder as the metallic powder pigment are described in Japanese Patent Publication Nos. 62-37678 (1987) and 1-56109 (1989).

The Japanese Patent Publication No. 62-37678 (1987) discloses a double coloring ink composition comprising a powdery metal pigment such as aluminum powder, an oil-soluble dye, a resin and a solvent, which has an outline effect realized by the penetration and diffusion of the dye around the writing formed by the powdery metal pigment. The Japanese Patent Publication No. 1-56109 (1989) discloses a metallic ink for a marking pen, which comprises a fine metal powder such as a surface-treated aluminum powder, a resin and a solvent, enables smooth delivery from the marking pen, and is easily dispersible at the time of use.

In the ink for a marking pen described in the above patent documents, the sedimentation and separation of the aluminum powder in the ink cannot be inhibited, because the ink has a relatively low viscosity. Thus, such an ink cannot be used unless it is put in an ink container of a writing utensil together with a stirring member such as a metallic ball and the utensil is shaken at the time of use to redisperse the sedimented powdery metal pigment.

Also proposed is a metallic ink for a ball-point pen which can dispense with any stirring member such as a metallic ball unlike the above-described ink for a marking pen.

Japanese Patent Laid-Open No. 60-186573 (1985) discloses an ink capable of realizing a metallic color, which comprises a solvent, a thickening resin soluble in the solvent, a powdery metal pigment and a coloring pigment each in an at least necessary amount and which has a viscosity higher than a necessitated level. It is described therein that since the sedimentation of the metal pigment is only slight in the ink having a high viscosity, it is suitably used for a pressure-type ball-point pen. In addition, Japanese Patent Publication No. 64-4551 (1989) discloses a gelled ink.

Japanese Patent Laid-Open No. 1-210478 (1989) discloses an aqueous metallic ink which is prevented from being stained by pin holes upon ink-application and which comprises a resin, an aluminum paste and water as the main components and an acetylenic alcohol derivative as an additive.

However, the above-described inks proposed in the prior arts are different from an aqueous metallic ink usable for ball-point pens.

Namely, the inks described in the Japanese Patent Publication Nos. 62-37678 (1987) and 1-56109 (1989) and Japanese Patent Laid-Open No. 60-186573 (1985) are oily inks, and the ink compositions described in the Japanese Patent Publication Nos. 62-37678 (1987) and 1-56109 (1989) are directed to a marking pen. The term "marking pen" as used herein refers to one containing a stirring member such as a metal ball in the ink container so that the sedimented aluminum powder can be redispersed by shaking the pen when it is used. In other words, these ink compositions for a marking pen are ones wherein the aluminum powder sediments in a short period of time.

The ink described in the above Japanese Patent Laid-Open No. 60-186573 (1985) is to be used for a ball-point pen having a pressure-type structure, and practically satisfactory results cannot be obtained when it is used for a ball-point pen having a cylindrical ink container usable under atmospheric pressure. The ink disclosed in the Japanese Patent Publication No. 64-4551 (1989) is also an oily ink. As described therein, this ink is nonflowable and, therefore, even though it is delivered in the form of sol by the rotation of the ball at the pen point, continuous writing is difficult. This ink has, therefore, a problem in practice.

The ink disclosed in the Japanese Patent Laid-Open No. 1-210478 (1989) is one developed for preventing staining by pin holes upon ink-application and this specification does not disclose the properties of the ink to be exhibited when it is used for a ball-point pen.

Thus, in designing an aqueous metallic ink containing an aluminum powder as a colorant and usable for a ball-point pen, it is indispensable to use a water-soluble resin to attain such an appropriate ink viscosity as to allow the aluminum powder to be used without redispersion. In addition, it is also indispensable to select suitable properties so that a suitable amount of the ink can be transferred from the ball surface of the ball-point pen to the surface of a substrate such as paper by the rotation of the ball and that the writing is free from bleeding and blurring.

DISCLOSURE OF INVENTION

An object of the present invention is to provide an aqueous metallic ink for a ball-point pen, which contains an aluminum powder as the colorant, which is prevented from suffering deterioration such as sedimentation of the aluminum powder even during storage for a long period of time, and which is excellent in delivery to enable continuous writing.

The present invention provides an aqueous metallic ink for a bail-point pen, which contains at least an aluminum powder, a natural polysaccharide or a derivative thereof as a thickener, a water-soluble organic solvent and water, and has a viscosity of 100 to 1,500 P(poise) (ST rotor of E-type viscometer, 1 rpm, 25° C.) and a ratio of the viscosity at 1 rpm to that at 10 rpm (ST rotor of E-type viscometer, 25° C.), i.e. the value of [viscosity at 1 rpm]/[viscosity at 10 rpm], of at least 3.0.

BEST MODE FOR CARRYING OUT THE INVENTION

A detailed description will be made on the present invention.

The aluminum powder is used as a pigment for imparting a metallic gloss to a writing in the present invention. A flaky aluminum powder is particularly desirable, since it realizes a clearer metallic gloss.

The aluminum powder is produced by, for example, the stamping method wherein aluminum pieces are pulverized together with an antifriction material such as stearic acid, the ball mill method wherein an aluminum powder obtained by spraying, a lubricant and a suitable liquid are fed into a drum together with steel balls and the drum is rotated to pulverize the aluminum powder. The aluminum powder is available on the market and it is also available in the form of an aluminum paste on the market. The aluminum paste is prepared by pulverizing and abrading an aluminum metal powder in a ball mill containing a petroleum solvent (mineral spirit) having a high boiling point and an antifriction material such as stearic acid to form fine aluminum particles in the form of very thin flakes and, therefore, the aluminum paste is relatively free from fire or explosion hazard and has an excellent storage stability, and thus it is easily handled when it is used.

The aluminum powder is used preferably in an amount of 3 to 15% by weight based on the total amount of the ink. When the amount thereof is below 3% by weight, no effective metallic gloss can be imparted to the writing and, on the contrary, when it exceeds 15% by weight, the solid content of the ink is increased to reduce the fluidity of the ink to thereby suppress ink delivery.

The average particle diameter of the aluminum powder is preferably 5 to 30 μm. When it is below 5 μm, the metallic gloss of the writing is reduced and the writing tends to be unclear and, on the contrary, when it is above 30 μm and the ball at the pen point has an ordinary size, ink delivery is so insufficient that the use of such an ink is difficult.

Commercially available aluminum pastes include "SUPER FINE No. 22000WN" and "SUPER FINE No. 18000WN" (trade names of the products of YAMATO METAL POWDER CO., LTD.) and "WB0230" (trade name of the product of TOYO ALUMINIUM K. K.). The aluminum powders are available on the market under trade names of "AA12", "No. 900" and "No. 18000" (trade names of the products of FUKUDA METAL FOIL & POWDER CO., LTD.).

The natural polysaccharides or derivatives thereof as a thickener are used in order to prevent the aluminum powder from causing sedimentation and to obtain the viscosity suitable for the ink for a ball-point pen. It is necessary to select ones having such property that even when they are used together with the aluminum powder in an aqueous ink, the effect of them is not impaired. Examples of such polysaccharides include ones derived from seeds, such as guar gum, locust-bean gum and derivatives thereof; ones produced by microorganisms, such as xanthan gum; ones obtained from seaweeds, such as carrageenan, alginic acid and derivatives thereof; and resin polysaccharides such as tragacanth gum. Particularly preferred is xanthan gum produced by microorganisms, since the properties thereof are stable and the quality of the writing realized with an ink for a ball-point pen containing it is not deteriorated even after storage for a long period of time. When the aluminum powder is dissolved in water in the form of aluminum ions by the effect of a very small amount of an electrolyte contained in the ink, a water-soluble resin such as a cellulosic or polyoxyethylenic resin usually used for preventing the pigment from causing sedimentation and for modifying the ink viscosity is inclined to be increased or decreased in viscosity because it is gelled, hydrolyzed or partially insolubilized by the action of the aluminum ions. On the contrary, when xanthan gum is used, the viscosity can be kept stable and the deterioration of the ink can be inhibited during the storage for a long period of time, though the viscosity is only slightly increased, since the glucuronic acid as the side chain of the xanthan gum is ionically bonded to the aluminum ion.

The natural polysaccharide or its derivative is used preferably in an amount of 0.7 to 2.0% by weight based on the total amount of the ink. When it is below 0.7% by weight, the aluminum powder is apt to cause sedimentation and, on the contrary, when it exceeds 2.0% by weight, the ink delivery from the pen point having an ordinary size is inclined to be reduced due to the viscosity of the ink.

The water-soluble organic solvent is used for the purposes of improving the qualities of the ink for a ball-point pen, such as prevention of the ink from drying at the pen point and from freezing at a low temperature. Examples of the water-soluble organic solvents include glycols such as ethylene glycol, diethylene glycol, triethylene glycol, propylene glycol, polyethylene glycols, 1,3-butylene glycol and thiodiethylene glycol, glycerol, ethylene glycol monomethyl ether, diethylene glycol monomethyl ether, 2-pyrrolidone, and triethanolamine. They are used either singly or in the form of a mixture of two or more of them. The amount of such a solvent is preferably 5 to 40% by weight based on the total amount of the ink.

Water is used as the main solvent.

The aqueous metallic ink of the present invention for a ball-point pen must have a viscosity of 100 to 1,500 P (ST rotor of E-type viscometer, 1 rpm, 25° C.) and a ratio of the viscosity at 1 rpm to that at 10 rpm (ST rotor of E-type viscometer, 25° C.) of at least 3.0. When the viscosity is below 100 P, the sedimentation and separation of the aluminum powder cannot be inhibited and, on the contrary, when it is above 1500 P, the movement of the ink in the ink container becomes unsmooth to make continuous writing impossible. When the ratio is below 3.0, the ink delivery from the pen point of a ball-point pen is impaired and no good writing can be obtained.

Although the aqueous metallic ink of the present invention for a ball-point pen basically comprises the above-described components and has the above-described properties, it can assume various modes. For example, in order to obtain a colored metallic writing, the aluminum powder can be used in combination with a water-soluble dye as another colorant such as a conventional acid dye, basic dye or direct dye. The acid dyes include, for example, C. I. Acid Yellow 23, C. I. Acid Red 52, C. I. Food Yellow 3 and C. I. Acid Blue 1. The basic dyes include, for example, C. I. Basic Blue 7 and C. I. Basic Red 1. The direct dyes include, for example, C. I. Direct Blue 86, C. I. Direct Green 6 and C. I. Direct Orange 8. The amount of the dye used is preferably 5 to 20% by weight based on the total amount of the ink. However, when the colorant is a combination of the aluminum powder and the conventional water-soluble dye, the inorganic salt content of the ink must be 0.5% by weight or below based on the total amount of the ink. When the inorganic salt content of the ink is above 0.5% by weight, the aluminum powder in the ink is deteriorated during the storage for a long period of time to make the realization of the metallic gloss of the writing impossible or discolor the writing, or the aluminum powder particles aggregate to cause sedimentation of the aluminum powder.

An effective means of reducing the inorganic salt content of the ink to 0.5% by weight or below comprises reducing the inorganic salt content of the above-described water-soluble dye which is the main cause for the contamination of the ink with the inorganic salt. The inorganic salt content of the waster-soluble dye can be reduced by a method wherein a commercially available dye is washed with an aqueous hydrochloric acid solution, a method wherein a commercially available dye is dissolved in water and hydrochloric acid is added to the resultant solution to precipitate the dye to be used, or a method wherein a commercially available dye is dissolved in an organic solvent, the resultant solution is filtered and the filtrate is dryed to obtain the dye to be used.

It is also possible to use an anionic or nonionic surfactant in order to improve the dispersibility of the aluminum powder in the ink. When the above-described aluminum paste is used as the aluminum powder, it is particularly desirable to use a polyoxyethylenealkylamine as the surfactant. When the surfaces of the aluminum powder particles are treated with a lipophilic substance such as a higher fatty acid, e.g. stearic acid, to form an aluminum paste, the lipophilic substance is easily removed from the surfaces of the aluminum powder particles by the surfactant. Consequently, the aluminum powder is denatured by the reaction with water. On the contrary, when the polyoxyethylenealkylamine is used as the surfactant, the above-described phenomenon of the deterioration of the aluminum powder scarcely occurs. Examples of the polyoxyethylenealkylamines include polyoxyethylene-(10)stearylamine, polyoxyethylene(15)stearylamine, polyoxyethylene(10)oleylamine and polyoxyethylene(15)oleylamine. They can be used either singly or in the form of a mixture of two or more of them. They are used preferably in an amount of 0.5 to 5.0% by weight based on the total amount of the ink. When the amount is below 0.5% by weight, the effect of dispersing the aluminum powder is occasionally insufficient and, on the contrary, when it exceeds 5.0% by weight the lipophilic substance such as stearic acid adsorbed on the surfaces of the aluminum powder particles is occasionally removed by the action of the polyoxyethylenealkylamine.

The ink of the present invention may further contain, if necessary, various other additives such as wetting agents, e.g. urea, ethyleneurea and thiourea; antiseptics based on, e.g., benzothiazoline and Omadine; and rust inhibitors such as benzotriazole.

The metallic ink of the present invention for ball-point pens can be produced by various known methods. For example, the ink can be easily produced by stirring the above-described components with a stirrer such as a Henschel mixer or by pulverizing them with a dispersing machine such as a ball mill to obtain the mixture.

The following Examples and Comparative Examples will further illustrate the present invention, wherein parts and percentages are given by weight.

EXAMPLE 1

| | |
|---|---|
| aluminum paste (SUPER FINE No. 22000WN; a product of YAMATO METAL POWDER CO., LTD.; aluminum powder content: 70%) | 10.0 parts |
| water | 63.9 parts |
| ethylene glycol | 15.0 parts |
| glycerol | 10.0 parts |

| -continued | |
|---|---|
| guar gum derivative (JAGUAR HP 60; a product of SANSHO CO., LTD.) | 1.0 part |
| antiseptic (1,2-benzisothiazoline-3-one, "PROXEL XL-2", a product of ICI Japan K.K.) | 0.1 part |

The components listed above excluding the guar gum derivative were mixed together by stirring with a stirrer for 1 hour. Then the guar gum derivative was added to the mixture and the resultant mixture was stirred for additional 1 hour to obtain an ink having a viscosity of 250 P (E-type viscometer, 1 rpm, 25° C.) and a ratio of the viscosity at 1 rpm to that at 10 rpm of 3.1. The ink was fed into a transparent ink container comprising a hollow polypropylene cylinder, one end of which was connected to a nickel silver ball-point pen tip (material for the ball: cemented carbide). When the ball-point pen was used for writing on a paper, a, clear silver writing free from bleeding was obtained.

EXAMPLE 2

| | |
|---|---|
| aluminum powder ("AA 12", a product of FUKUDA METAL FOIL & POWDER CO., LTD.) | 10.0 parts |
| water | 57.9 parts |
| propylene glycol | 20.0 parts |
| ethylene glycol | 10.0 parts |
| locust-bean gum | 2.0 parts |
| antiseptic (1,2-benzisothiazoline-3-one, "PROXEL GXL", a product of ICI Japan K.K.) | 0.1 part |

The components listed above were mixed together by stirring with a stirrer for 2 hours to obtain an ink having a viscosity of 350 P (E-type viscometer, 1 rpm, 25° C.) and a ratio of the viscosity at 1 rpm to that at 10 rpm of 3.1. When the ink was used for writing on a paper in the same manner as that of Example 1, a clear silver writing free from bleeding was obtained.

EXAMPLE 3

| | |
|---|---|
| aluminum powder ("AA12") | 10.0 parts |
| purified water-soluble dye 1 | 6.0 parts |
| guar gum derivative ("JAGUAR HP60") | 2.0 parts |
| propylene glycol | 20.0 parts |
| ethylene glycol | 10.0 parts |
| water | 51.9 parts |
| antiseptic ("PROXEL GXL") | 0.1 part |

The components listed above were mixed together by stirring with a stirrer for 2 hours to obtain an ink having a viscosity of 350 P (E-type viscometer, 1 rpm, 25° C.) and a ratio of the viscosity at 1 rpm to that at 10 rpm of 4.0. The ink had an inorganic salt content of 0.01%. When the ink was used for writing on a paper in the same manner as that of Example 1, a clear copper writing free from bleeding was obtained.

The purified water-soluble dye 1 was prepared by the following method:

10 parts of C. I. Food Yellow 3 was added to 100 parts of methanol under stirring. The resultant mixture was stirred for 30 minutes and then an insoluble matter was filtered out. Methanol was distilled off from the filtrate, and the resultant solid was dried to obtain the purified water-soluble dye 1. It had an inorganic salt content of 0.15

EXAMPLE 4

| | |
|---|---|
| aluminum paste ("SUPER FINE No. 22000WN") | 10.0 parts |
| purified water-soluble dye 2 | 9.0 parts |
| locust-bean gum | 2.0 parts |
| ethylene glycol | 10.0 parts |
| glycerol | 10.0 parts |
| water | 58.9 parts |
| antiseptic ("PROXEL XL-2") | 0.1 part |

The components listed above were mixed together by stirring with a stirrer for 2 hours to obtain an ink having a viscosity of 340 P (E-type vlscometer, 1 rpm, 25° C.) and a ratio of the viscosity at 1 rpm to that at 10 rpm of 3.3. The ink had an inorganic salt content of 0.25%. When the ink was used for writing on a paper in the same manner as that of Example 1, a clear metallic green writing free from bleeding was obtained.

The purified water-soluble dye 2 was prepared by the following method:

10 parts of C. I. Direct Green 6 was added to 100 parts of 10% aqueous hydrochloric acid solution under stirring. The resultant mixture was stirred for 30 minutes and then filtered. The solid product was dried at 80° C. to obtain the purified water-soluble dye 2. It had an inorganic salt content of 3.0%.

EXAMPLE 5

| | |
|---|---|
| aluminum paste ("SUPER FINE No. 22000WN") | 10.0 parts |
| xanthan gum | 2.0 parts |
| water | 61.9 parts |
| ethylene glycol | 10.0 parts |
| glycerol | 15.0 parts |
| surfactant (polyoxyethylene glycerol borate oleate) | 1.0 part |
| antiseptic ("PROXEL GXL") | 0.1 part |

The components listed above were mixed together by stirring with a laboratory mixer for 1 hour to obtain an ink having a viscosity of 730 P (E-type viscometer, 1 rpm, 25° C.) and a ratio of the viscosity at 1 rpm to that at 10 rpm of 6.2. When the ink was used for writing on a paper in the same manner as that of Example 1, a clear silver writing free from bleeding was obtained.

EXAMPLE 6

| | |
|---|---|
| aluminum powder ("No. 900", a product of FUKUDA METAL FOIL & POWDER CO. LTD.) | 10.0 parts |
| xanthan gum | 1.5 parts |
| water | 68.4 parts |
| propylene glycol | 10.0 parts |
| glycerol | 10.0 parts |
| antiseptic ("PROXEL GXL") | 0.1 part |

The components listed above were mixed together by stirring with a laboratory mixer for 1 hour to obtain an ink having a viscosity of 400 p (E-type viscometer, 1 rpm, 25° C.) and a ratio of the viscosity at 1 rpm to that at 10 rpm of 5.5. When the ink was used for writing on a paper in the same manner as that of Example 1, a clear silver writing free from bleeding was obtained.

EXAMPLE 7

| | |
|---|---|
| aluminum paste ("SUPER FINE No. 18000WN"; a product of YAMATO METAL POWDER CO., LTD.; aluminum powder content: 70%) | 10.0 parts |
| xanthan gum | 1.2 parts |
| water | 63.7 parts |
| propylene glycol | 15.0 parts |
| glycerol | 10.0 parts |
| antiseptic ("PROXEL GXL") | 0.1 part |

The components listed above were mixed together by stirring with a laboratory mixer for 1 hour to obtain an ink having a viscosity of 330 P (E-type viscometer, 1 rpm, 25° C.) and a ratio of the viscosity at 1 rpm to that at 10 rpm of 5.0. When the ink was used for writing on a paper in the same manner as that of Example 1, a clear silver writing free from bleeding was obtained.

EXAMPLE 8

| | |
|---|---|
| aluminum paste ("WB0230"; a product of TOYO ALUMINIUM K.K.; aluminum powder content: 68.4%) | 10.0 parts |
| xanthan gum | 1.0 part |
| water | 67.9 parts |
| propylene glycol | 10.0 parts |
| glycerol | 10.0 parts |
| surfactant [polyoxyethylene (10) nonylphenyl ether] | 1.0 part |
| antiseptic ("PROXEL XL-2") | 0.1 part |

The components listed above were mixed together by stirring with a laboratory mixer for 1 hour to obtain an ink having a viscosity of 300 P (E-type viscometer, 1 rpm, 25 ° C.) and a ratio of the viscosity at 1 rpm to that at 10 rpm of 5.0. When the ink was used for writing on a paper in the same manner as that of Example 1, a clear silver writing free from bleeding was obtained.

EXAMPLE 9

| | |
|---|---|
| aluminum paste ("WB0230") | 10.0 parts |

| | |
|---|---|
| xanthan gum | 2.0 parts |
| water | 61.9 parts |
| ethylene glycol | 10.0 parts |
| glycerol | 15.0 parts |
| surfactant [polyoxyethylene (15) oleylamine] | 1.0 part |
| antiseptic ("PROXEL GXL") | 0.1 part |

The components listed above were mixed together by stirring with a laboratory mixer for 1 hour to obtain an ink having a viscosity of 730 P (E-type viscometer, 1 rpm, 25° C.) and a ratio of the viscosity at 1 rpm to that at 10 rpm of 6.2. When the ink was used for writing on a paper in the same manner as that of Example 1, a clear silver writing free from bleeding was obtained.

EXAMPLE 10

| | |
|---|---|
| aluminum paste ("SUPER FINE No. 22000WN") | 10.0 parts |
| guar gum derivative ("JAGUAR HP60") | 1.5 parts |
| water | 68.4 parts |
| propylene glycol | 10.0 parts |
| glycerol | 8.5 parts |
| surfactant [polyoxyethylene (15) stearylamine] | 1.5 parts |
| antiseptic ("PROXEL GXL") | 0.1 part |

The components listed above were mixed together by stirring with a laboratory mixer for 1 hour to obtain an ink having a viscosity of 400 P (E-type viscometer, 1 rpm, 25° C.) and a ratio of the viscosity at 1 rpm to that at 10 rpm of 5.5. When the ink was used for writing on a paper in the same manner as that of Example 1, a clear silver writing free from bleeding was obtained.

Comparative Example 1

The same procedure as that of Example 1 was repeated except that the amount of the guar gum derivative was reduced to 0.5 part and the balance was compensated with water to obtain an ink having a viscosity of 48 P (E-type viscometer, 1 rpm, 25° C.) and a ratio of the viscosity at 1 rpm to that at 10 rpm of 2.4. When the ink was used for writing on a paper in the same manner as that of Example 1, a clear silver writing free from bleeding was obtained.

Comparative Example 2

The same procedure as that of Example 1 was repeated except that the amount of the guar gum derivative was reduced to 0.1 part and the balance was compensated with water to obtain an ink having a viscosity of 1.98 P (E-type viscometer, 1 rpm, 25° C.) and a ratio of the viscosity at 1 rpm to that at 10 rpm of 1.15.

Comparative Example 3

The same procedure as that of Example 1 was repeated except that the amount of the guar gum derivative was increased to 3.0 parts and the amount of water was reduced by the corresponding amount to obtain an ink having a viscosity of 200 P (E-type viscometer, 1 rpm, 25° C.) and a ratio of the viscosity at 1 rpm to that at 10 rpm of 5.0. When the ink was used for writing on a paper in the same manner as that of Example 1, continuous writing was impossible, though a clear silver writing was obtained.

Comparative Example 4

The same procedure as that of Example 3 was repeated except that the purified water-soluble dye 1 (purified C. I. Food Yellow 3) was replaced with unpurified C. I. Food Yellow 3 having an inorganic salt content of 20% to obtain an ink having a viscosity of 350 P (E-type viscometer, 1 rpm, 25° C.) and a ratio of the viscosity at 1 rpm to that at 10 rpm of 4.0. The ink had an inorganic salt content of 1.20%.

Comparative Example 5

| | |
|---|---|
| aluminum paste ("SUPER FINE No. 22000WN") | 10.0 parts |
| purified waste-soluble dye 2 | 6.0 parts |
| C.I. Direct Green 6 (unpurified; inorganic salt content: 20%) | 3.0 parts |
| locust bean gum | 2.0 parts |
| ethylene glycol | 10.0 parts |
| glycerol | 10.0 parts |
| water | 58.9 parts |
| antiseptic ("PROXEL XL-2") | 0.1 parts |

An ink having a viscosity of 340 P (E-type viscometer, 1 rpm, 25° C.) and a ratio of the viscosity at 1 rpm to that at 10 rpm of 3.3 was obtained from the above-listed components in the same manner as that of Example 4. The ink had an inorganic salt content of 0.78.

Comparative Example 6

| | |
|---|---|
| aluminum powder ("No. 900") | 10.0 parts |
| hydroxyethylcellulose ("SY25F"; a product of FUJI CHEMICALS CO., LTD.) | 1.5 parts |
| water | 68.4 parts |
| propylene glycol | 10.0 parts |
| glycerol | 10.0 parts |
| antiseptic ("PROXEL GXL") | 0.1 part |

The components listed above were stirred with a laboratory mixer for 1 hour to obtain an ink having a viscosity of 400 P (E-type viscometer, 1 rpm, 25° C.) and a ratio of the viscosity at 1 rpm to that at 10 rpm of 2.5.

Comparative Example 7

| | |
|---|---|
| aluminum powder ("No. 900") | 10.0 parts |
| hydroxyethylcellulose ("SY25F") | 1.5 parts |
| water | 67.4 parts |
| propylene glycol | 10.0 parts |
| glycerol | 10.0 parts |
| surfactant [polyoxyethylene (15) oleylamine] | 1.0 part |
| antiseptic ("PROXEL GXL") | 0.1 part |

The components listed above were stirred with a laboratory mixer for 1 hour to obtain an ink having a viscosity of 400 P (E-type viscometer, 1 rpm, 25° C.) and a ratio of the viscosity at 1 rpm to that at 10 rpm of 2.5.

The viscosity change test, writing test and sedimentation test of the aqueous metallic inks for a ball-point pen obtained in the above Examples 1 to 10 and Comparative Examples 1 to 7 were conducted. The results are given in Table 1.

Viscosity change test

The viscosity of each ink was measured immediately after the production thereof and after leaving it for one month, and the results were compared with each other.

Measurement conditions:

E-type viscometer, 1 rpm, 25° C. (unit: P)

Resting conditions: The ink was put into a screw-capped glass bottle and kept in a thermostatic chamber at 50° C. for one month.

Writing test

A writing utensil filled with the ink was prepared. The state of the writing obtained immediately after the preparation was compared with that obtained after leaving the writing utensil to stand for one month.

Preparation of writing utensil: 0.8 g of the ink was fed into a transparent ink container comprising a hollow polypropylene cylinder, one end of which was connected to a ball-point pen tip. 0.1 g of a backflow inhibiting material was further fed above the ink in the ink container and then bubbles were removed by centrifugation.

Writing paper: woodfree paper (writing paper A according to JIS P 3201).

Resting conditions: The pen was left to stand in a thermostatic chamber at 50° C. for one month while the pen point was kept downward.

Evaluation:
⊚: good writing possible,
○: writing possible,
Δ: blurring observed,
x: writing impossible.

Sedimentation test

The ink was fed into the ink container and left to stand for one month. Then the sedimentation state was observed. The results were given in terms of [length of supernatant liquid (mm)/length of ink column (mm)].

Ink column: 0.8 g of the ink was fed into a transparent ink container comprising a hollow polypropylene cylinder having an inner diameter of 3 mm. 0.1 g of a backflow inhibiting material was further fed above the ink in the ink container and then bubbles were removed by centrifugation. The length of the ink column was about 90 mm.

Resting conditions: The sample was left to stand in a thermostatic chamber at 50° C. for one month,

TABLE 1

| | Viscosity change test (immediately → after leaving) | Writing test (immediately → after leaving) | Sedimentation test |
|---|---|---|---|
| Ex. 1 | 250 → 180 | ○ → ○ | 0/90 |
| Ex. 2 | 350 → 250 | ○ → ○ | 0/90 |
| Ex. 3 | 350 → 260 | ○ → ○ | 0/90 |
| Ex. 4 | 340 → 290 | ○ → ○ | 0/90 |
| Ex. 5 | 730 → 500 | ⊚ → ⊚ | 0/90 |
| Ex. 6 | 400 → 380 | ○ → ○ | 0/89 |
| Ex. 7 | 330 → 300 | ○ → ○ | 0/89 |
| Ex. 8 | 300 → 180 | ⊚ → ⊚ | 0/90 |
| Ex. 9 | 730 → 710 | ⊚ → ⊚ | 0/90 |
| Ex. 10 | 400 → 380 | ⊚ → ⊚ | 0/90 |
| Comp. Ex. 1 | 48 → 28 | ○ → x | 50/90 |
| Comp. Ex. 2 | 1.98 → 0.5 | x → x | 70/90 |
| Comp. Ex. 3 | 2000 → 1900 | Δ → Δ | 0/90 |
| Comp. Ex. 4 | 350 → 30 | ○ → x | 40/90 |
| Comp. Ex. 5 | 340 → 50 | ○ → x | 35/90 |
| Comp. Ex. 6 | 400 → 60 | ○ → x | 40/90 |
| Comp. Ex. 7 | 400 → 80 | ⊚ → x | 80/89 |

Note) In Comparative Example 2, the aluminum powder was sedimented in the course of eliminating the bubbles by centrifugation and writing was impossible.

As described above in detail, the aqueous metallic ink for a ball-point pen of the present invention is free from deterioration such as sedimentation of the aluminum powder during the storage for a long period of time and it can be used for continuous writing to obtain excellent results.

We claim:

1. An aqueous metallic ink for a ball-point pen, characterized by containing at least an aluminum powder, a natural polysaccharide or a derivative thereof as a thickener, a water-soluble organic solvent and water, and having a viscosity of 100 to 1,500 P (ST rotor of E-type viscometer, 1 rpm, 25° C.) and a ratio of the viscosity at 1 rpm to that at 10 rpm (ST rotor of E-type viscometer, P. 25° C.) of at least 3.0.

2. An aqueous metallic ink for a ball-point pen according to claim 1, wherein the aluminum powder is flaky.

3. An aqueous metallic ink for a ball-point pen according to claim 1, characterized in that the aluminum powder has a particle diameter of 5 to 30 μm.

4. An aqueous metallic ink for a ball-point pen according to claim 1, characterized in that the amounts of the aluminum powder, natural polysaccharide or derivative thereof and water-soluble organic solvent are 8 to 15% by weight, 0.7 to 2.0% by weight and 5 to 40% by weight, respectively, based on the total amount of the ink, and the balance is water.

5. An aqueous metallic ink for a ball-point pen according to claim 1, characterized in that the natural polysaccharide as a thickener is xanthan gum.

6. An aqueous metallic ink for a ball-point pen according to claim 1, characterized by further containing a water-soluble dye and having the content of inorganic salts in the ink of 0.5% by weight or below based on the total amount of the ink.

7. An aqueous metallic ink for a ball-point pen according to claim 1, characterized by further containing a polyoxyethylenealkylamine.

\* \* \* \* \*